(12) United States Patent
Bagawan et al.

(10) Patent No.: US 12,000,130 B2
(45) Date of Patent: Jun. 4, 2024

(54) VACUUM TOILET OVERRIDE SYSTEMS AND METHODS

(71) Applicant: B/E AEROSPACE, INC., Winston Salem, NC (US)

(72) Inventors: Mahammadrafi Bagawan, Bangalore (IN); Gururaja Bambila, Bangalore (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 123 days.

(21) Appl. No.: 17/708,742

(22) Filed: Mar. 30, 2022

(65) Prior Publication Data
US 2023/0193611 A1  Jun. 22, 2023

(30) Foreign Application Priority Data
Dec. 18, 2021  (IN) .............................. 202141059207

(51) Int. Cl.
*E03D 1/34* (2006.01)
*E03D 5/092* (2006.01)
*F16K 31/04* (2006.01)

(52) U.S. Cl.
CPC .............. *E03D 1/34* (2013.01); *E03D 5/092* (2013.01); *F16K 31/047* (2013.01)

(58) Field of Classification Search
CPC ......... E03D 1/34; E03D 5/092; F16K 31/047; B64D 11/02; E03F 1/006
See application file for complete search history.

(56) References Cited

U.S. PATENT DOCUMENTS

| 1,996,365 | A | * | 4/1935 | Clinedinst | ............... F16K 31/05 475/2 |
|---|---|---|---|---|---|
| 2,028,896 | A | * | 1/1936 | Brinker | ................. H01T 13/462 313/142 |
| 2,251,633 | A | * | 8/1941 | Panish | .................... F16K 31/05 74/625 |
| 4,562,908 | A | * | 1/1986 | Zouzoulas | .............. F16D 11/14 192/114 R |
| 4,693,447 | A | | 9/1987 | Perez | |
| 6,098,956 | A | | 8/2000 | Sprague, II | |
| 8,172,198 | B2 | | 5/2012 | Dorsey et al. | |
| 8,910,320 | B2 | | 12/2014 | Stauber et al. | |
| 10,760,255 | B2 | | 9/2020 | Bucher et al. | |

FOREIGN PATENT DOCUMENTS

| DE | 2914364 | 10/1979 |
|---|---|---|
| RU | 2721797 | 5/2020 |

OTHER PUBLICATIONS

European Patent Office, European Search Report dated Aug. 17, 2023 in Application No. 22211023.1.

* cited by examiner

*Primary Examiner* — Patrick C Williams
(74) *Attorney, Agent, or Firm* — SNELL & WILMER L.L.P.

(57) ABSTRACT

A manual override mechanism for use in a vacuum toilet system may comprise: a shaft extending from a knob; a traveler configured to engage the shaft, the traveler comprising a first gear; a motor rack comprising a second gear configured to engage the first gear; and a flush gate extending from the motor rack, the flush gate configured to transition from a closed position to an open position in response to rotation of the shaft.

15 Claims, 5 Drawing Sheets

VACUUM TOILET OVERRIDE SYSTEMS AND METHODS

CROSS-REFERENCE TO RELATED APPLICATIONS

This application is a non-provisional of, and claims priority to, and the benefit of India Provisional Application No. 202141059207 with DAS Code FC33, entitled "VACUUM TOILET OVERRIDE SYSTEMS AND METHODS," filed on Dec. 18, 2021, which is hereby incorporated by reference in its entirety for all purposes.

FIELD

The present disclosure relates to drain systems and methods for improved vacuum toilet override systems and methods and, more particularly, mechanisms for manual override of vacuum toilet assemblies for use in aircraft lavatories.

BACKGROUND

Aircraft cabins include lavatories having drain systems disposed therein. Presently, manual handles for servicing, maintenance, and during non-operation of motor driven system are positively coupled with the flush gate or a cable is being utilized to operate the flush gate. Thus, the manual handles typical have large envelopes due to their large range of motion. The manual handles include excessive noise during use and high wear and tear during use. Additionally, the manual override handles may cause vibration due to the handle movement, may be inflexible for any for various angles for mounting, and/or may not be adaptable to a variety of toilet applications.

SUMMARY

A manual override mechanism for use in a vacuum toilet system is disclosed herein. The manual override mechanism may comprise: a shaft extending from a knob; a traveler configured to engage the shaft, the traveler comprising a first gear; a motor rack comprising a second gear configured to engage the first gear; and a flush gate extending from the motor rack, the flush gate configured to transition from a closed position to an open position in response to rotation of the shaft.

In various embodiments, the shaft comprises a guide groove; and the traveler comprises a guide pin configured to engage the guide groove.

In various embodiments, the manual override mechanism may further comprise a forward support bearing and an aft support bearing, the traveler disposed axially between the forward support bearing and the aft support bearing. The manual override mechanism may further comprise a forward axial stopper and an aft axial stopper disposed between the forward support bearing and the aft support bearing. The forward axial stopper and the aft axial stopper may be configured to limit a total travel distance of the traveler.

In various embodiments, the traveler is configured to rotate about and translate axially relative to a central axis of the shaft in response to rotation of the shaft. The motor rack may be configured to rotate about a second central axis of the motor rack in response to the traveler translating axially along the shaft.

A vacuum toilet system is disclosed herein. The vacuum toilet system may comprise: a motor rack; a flush gate extending from the motor rack, the flush gate configured to transition from a closed position to an open position in response to the motor rack being activated; and a manual override mechanism, comprising: a shaft extending from a knob; a forward support bearing spaced apart axially from an aft support bearing, the forward support bearing and the aft support bearing configured to support the shaft; and a traveler disposed between the first support bearing and the aft support bearing, the traveler configured to engage the shaft.

In various embodiments, the shaft comprises a groove and the traveler comprises a guide pin. In various embodiments, the guide pin is configured to travel within the groove. In various embodiments, the groove is a helical groove.

In various embodiments, the vacuum toilet system may further comprise a forward stopper and an aft stopper, the traveler disposed axially between the forward stopper and the aft stopper.

In various embodiments, the traveler is configured to idle in response to the motor rack being activated during normal operation.

In various embodiments, the motor rack comprises a gear configured to engage the traveler.

In various embodiments, the flush gate transitions from the closed position to the open position in response to rotation of the shaft.

A method of operating a manual override mechanism is disclosed herein. The method may comprise: rotating a knob of the manual override mechanism, wherein in response to rotating the knob: a shaft extending from the knob rotates, a traveler rotates about a central axis of the shaft and translates axially along the shaft, a motor rack rotates about a second central axis of the motor rack; and a flush gate rotates about the second central axis of the motor rack and transitions from a closed position to an open position.

In various embodiments, the traveler stops translating in response to engaging an axial stopper.

In various embodiments, the traveler comprises a first gear configured to engage a second gear of the motor rack.

In various embodiments, the traveler includes a guide pin that travels in a guide groove of the shaft during translating of the traveler. The guide groove may have a helical shape.

The forgoing features and elements may be combined in various combinations without exclusivity, unless expressly indicated herein otherwise. These features and elements as well as the operation of the disclosed embodiments will become more apparent considering the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein refers to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Overflow of a toilet bowl may lead to discomfort, inconvenience to passengers, blockage of lavatory use, etc. Leakage due to a malfunctioning rinse valve may cause a toilet drainage system to continuously run and lead to an emptying of clean water and filling of a waste tank. Similarly, erroneous readings of waste level in a waste tank may lead to blocking a lavatory use unnecessarily, resulting in discomfort of passengers due to long wait lines or the like. Overflow conditions of typical plumbing systems are manually detected (e.g., via a passenger or service person upon an aircraft).

Figure 1:
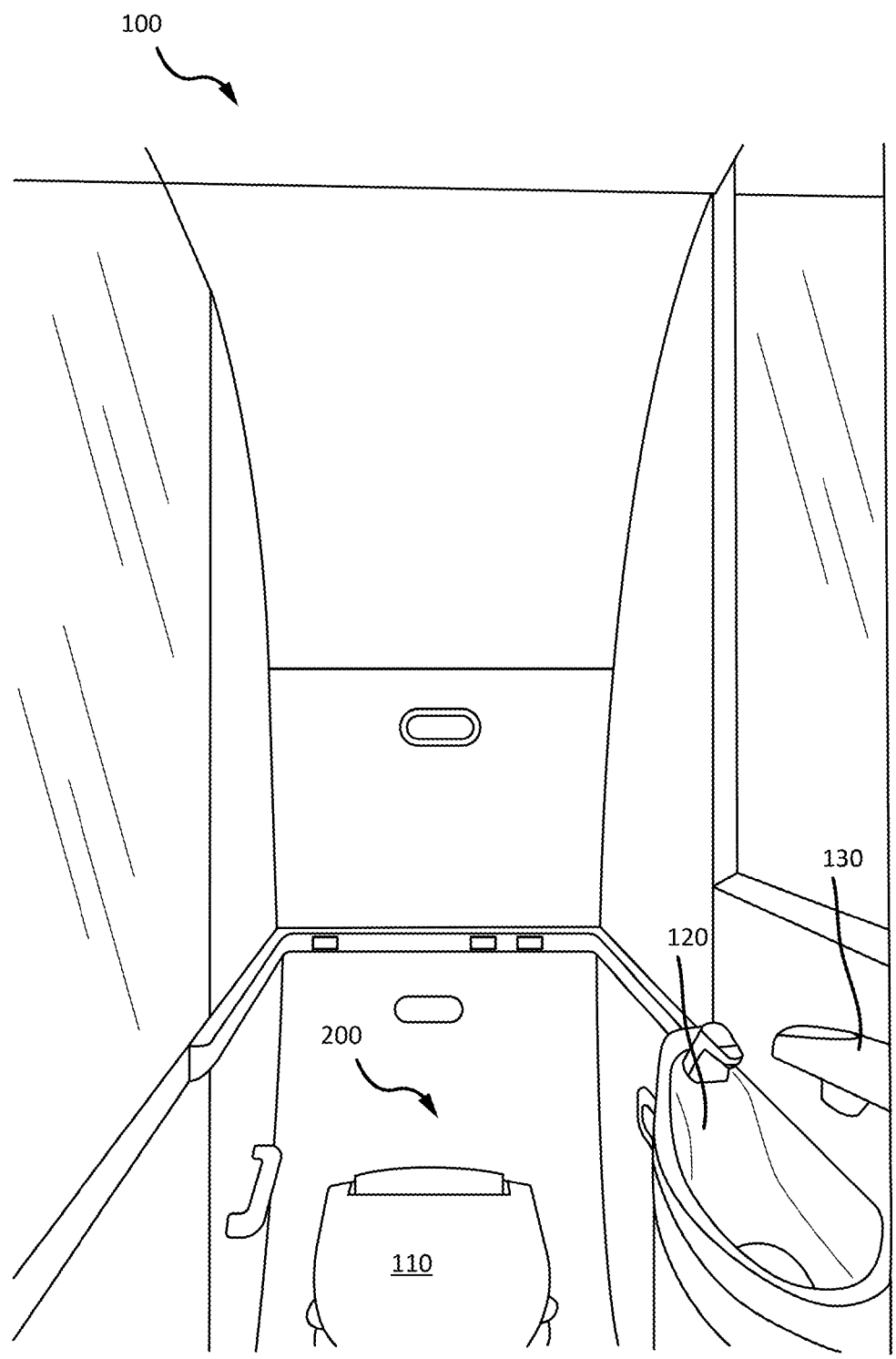
FIG. 1 illustrates a perspective view of a lavatory for an aircraft, in accordance with various embodiments.

Referring now to FIG. 1, a perspective view of a lavatory 100 of an aircraft is illustrated in accordance with various embodiments. The lavatory 100 comprises a toilet 110, a water basin 120 (e.g., a sink), and a faucet 130. In various embodiments, the lavatory 100 further comprises a vacuum toilet system 200. The vacuum toilet system 200 is in fluid communication with the toilet 110, the water basin 120, and the faucet 130. In this regard, in response to flushing the toilet 110, waste water may be transferred throughout the vacuum toilet system 200 as described further herein. Similarly, in response to running water via the faucet 130, waste water may be transferred throughout the vacuum toilet system 200 as described further herein.

Figure 2:
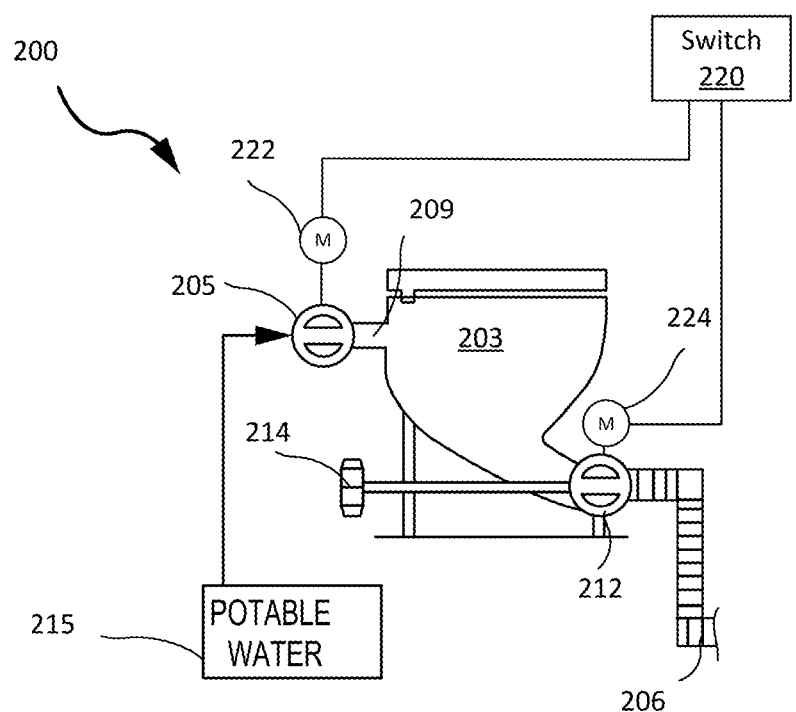
FIG. 2 illustrates a schematic view of a vacuum toilet system, in accordance with various embodiments.

Referring now to FIG. 2, a vacuum toilet system 200 is illustrated, in accordance with various embodiments. In various embodiments, the vacuum toilet system 200 comprises a rinse valve 205 and a flush gate valve 212 associated with a toilet bowl (e.g., toilet bowl 203). The rinse valve 205 is configured to open in response to external activation (e.g., via compression of switch 220). Similarly, the flush gate valve 212 is configured to open in response to external activation (e.g., via compression of switch 220). In this regard, in response to compression of the switch 220, motors 222 and 224 are configured to transition the valves 205, 212 from a closed position to an open position, in accordance with various embodiments. In response to opening the rinse valve 205 and the flush gate valve, waste water (e.g., potable water) may flow (e.g., via fluid conduit 209) from a potable water tank 215 to the toilet bowl 203 and out the fluid conduit 206 to a waste tank.

In various embodiments, the vacuum toilet system 200 comprises a manual override mechanism 214 coupled to the flush gate valve 212. The manual override mechanism is configured to manually open and close the flush gate valve 212. In this regard, during service, maintenance, or the like, the flush gate valve 212 may be opened and closed manually as described further herein.

Figures 3A, 3B:
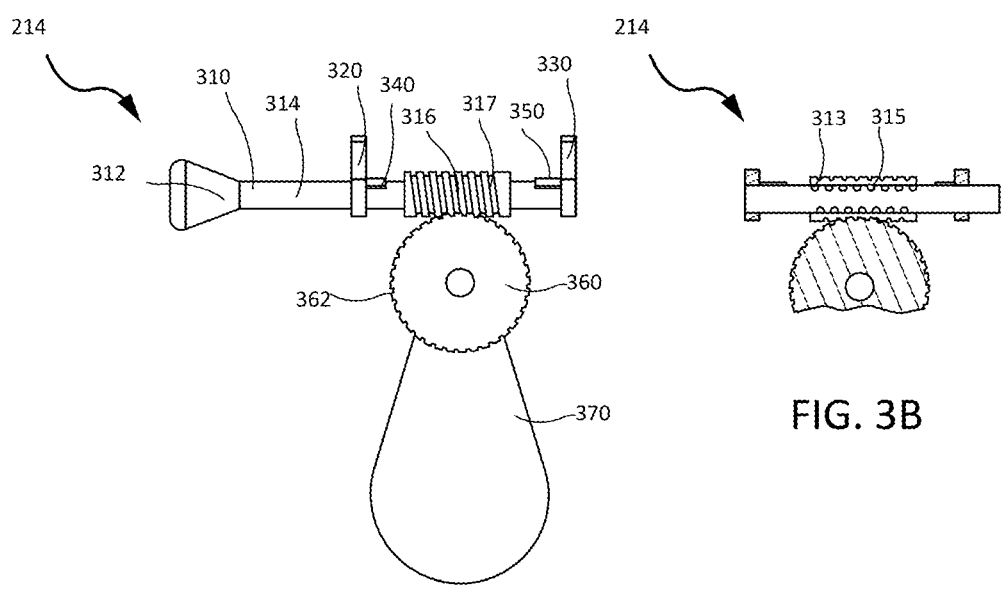
FIG. 3A illustrates a side view manual override mechanism for a vacuum toilet system, in accordance with various embodiments.
FIG. 3B illustrates a cross-sectional view of a manual override mechanism for a vacuum toilet system in accordance with various embodiments.

Referring now to FIG. 3A, a side view of the manual override mechanism 214 is illustrated, in accordance with various embodiments. The manual override mechanism 214 comprises a lead screw 310. The lead screw 310 includes a knob 312, a shaft 314, and a traveler 316. In various embodiments, the traveler 316 comprise an external gear 317 (e.g., a helical gear or the like). The manual override mechanism 214 further comprises a forward support bearing 320 and an aft support bearing 330. The support bearings 320, 330 are configured to support the shaft 314 of the lead screw. In this regard, the support bearings 320, 330 are configured to fix the shaft 314 in an axial position and facilitate rotation of the shaft 314 about a central axis defined by the shaft 314. In various embodiments, the manual override mechanism 214 further comprises a forward axial stopper 340 and an aft axial stopper 350. The stoppers 340, 350 are configured to limit a total travel length of the traveler 316, in accordance with various embodiments. In this regard, the stoppers 340, 350 are configured to ensure the traveler remains engaged throughout operation. In various embodiments, the traveler 316 acts as an idler during normal operation.

Figure 4A:
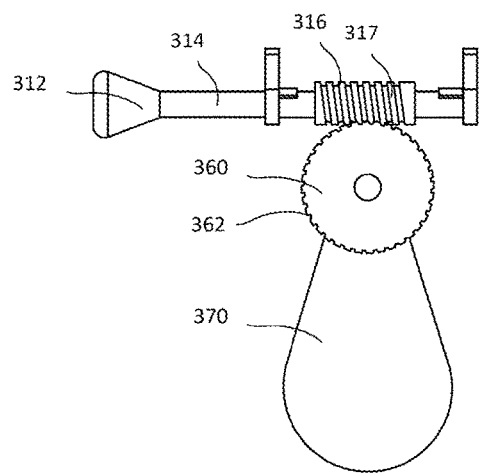
FIG. 4A illustrates a side view of a manual override mechanism with a flush gate in a closed position, in accordance with various embodiments.
Figure 4B:
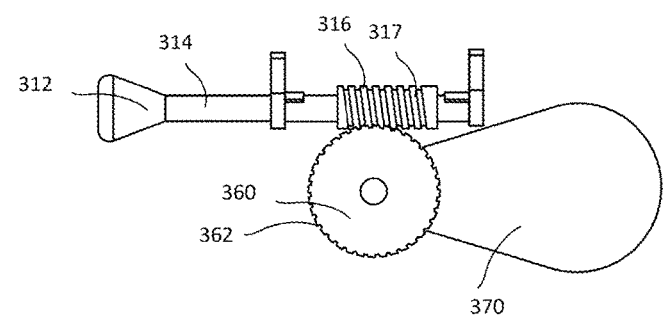
FIG. 4B illustrates a side view of a manual override mechanism with a flush gate in an open position, in accordance with various embodiments.

In various embodiments, the manual override mechanism 214 further comprises a motor rack 360 and a flush gate extending radially outward from the motor rack 360. In various embodiments, the motor rack 360 and the flush gate 370 may be a monolithic component, which may reduce one step of motion transition to a gear 362 of the motor rack 360. The motor rack 360 is operably coupled to the switch 220 from FIG. 2. In this regard, the switch 220 is configured to operate the motor rack 360 during normal operation. The motor rack 360 comprises the gear 362 disposed on a radially outer surface of the motor rack 360. The gear 362 engages the external gear 317 of the traveler 316. In this regard, with brief reference to FIGS. 4A and 4B, in response to the traveler 316 translating axially along the shaft 314 in response to rotation of the knob 312, the motor rack 360 is configured to rotate about a centerline of the motor rack 360 in response to engagement between the external gear 317 and the gear 362. Thus, in response to rotating the knob 312, the flush gate 370 is configured to transition from a closed position to an open position or vice versa based on the direction the knob 312 is rotated.

Referring now to FIG. 3B, the manual override mechanism further comprises a guide pin 315 coupled to the traveler 316. The guide pin 315 is configured to sit within a groove 313 disposed in the shaft 314. Thus, the guide pin 315 is configured to travel within the groove 313 and guide the traveler 316 in an axial direction along the shaft 314. In various embodiments, the groove 313 is configured in a spiral pattern about the shaft 314.

Figure 5:
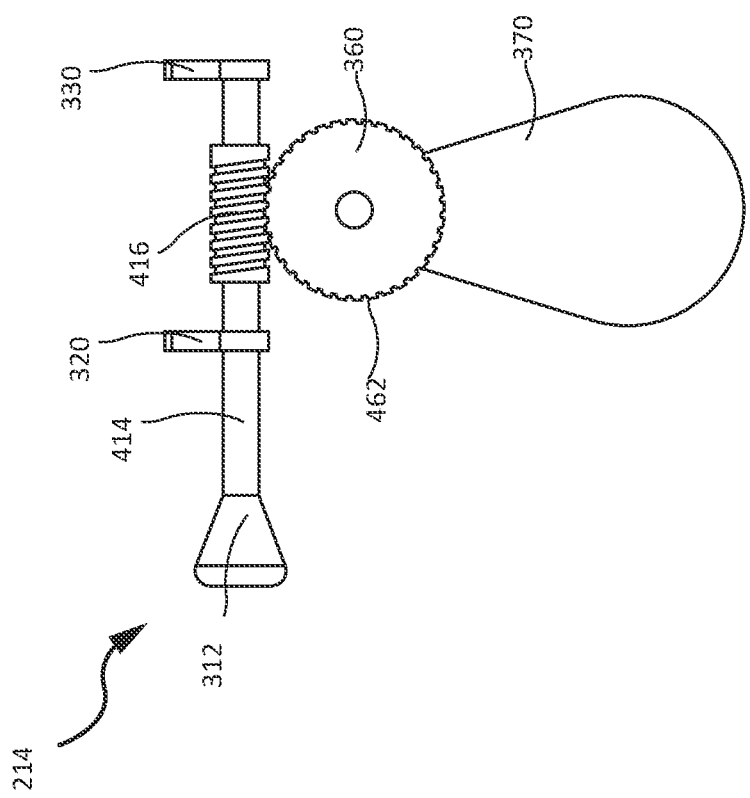
FIG. 5 illustrates a side view manual override mechanism for a vacuum toilet system, in accordance with various embodiments.

Although described herein with respect to a traveler 316, the present disclosure is not limited in this regard. For example, as shown in FIG. 5, the manual override mechanism 214 may comprise a wormshaft 414 and a worm gear 416. In this regard, the worm gear 416 may be fixed to the wormshaft 414 and remain in a constant axial position during operation. Thus, the motor rack 360 may comprise a worm wheel 462 configured to engage the worm gear 416. In this regard, rotation of the wormshaft 414 about a centerline of the wormshaft 414 may cause rotation of the motor rack 360 about a centerline of the motor rack 360. In various embodiments, the support bearing 320 may be configured with a circumferential stopper, or the like to prevent over rotation of the flush gate 370, in accordance with various embodiments.

In various embodiments, the manual override mechanism 214 may comprise components manufactured from thermoplastic materials as the manual override mechanism 214 may carry less load relative to typical mechanisms. In this regard, the manual override mechanism 214 may be lighter weight relative to typical mechanisms, in accordance with various embodiments. In various embodiments, the manual override mechanism 214 comprises a significantly smaller operating envelope relative to typical mechanism. In various embodiments, the manual override mechanism 214 may a reliable and precise flush lever mechanism. In various embodiments, the manual override mechanism 214 may be adaptable to various vacuum toilet systems. In various embodiments, the manual override mechanism 214 may be user friendly for use during service or maintenance of the vacuum toilet system 200 from FIG. 2.

In various embodiments, the manual override mechanism 214 is compact. In various embodiments, the manual override mechanism 214 may exhibit less wear and tear relative to typical manual override mechanisms.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A manual override mechanism for use in a vacuum toilet system, comprising:
   a shaft extending from a knob;
   a traveler configured to engage the shaft, the traveler comprising a first gear;
   a motor rack comprising a second gear configured to engage the first gear; and
   a flush gate extending from the motor rack, the flush gate configured to transition from a closed position to an open position in response to rotation of the shaft, wherein
   the shaft comprises a guide groove,
   the guide groove is a helical groove, and
   the traveler comprises a guide pin configured to engage the guide groove.

2. The manual override mechanism of claim 1, further comprising a forward support bearing and an aft support bearing, the traveler disposed axially between the forward support bearing and the aft support bearing.

3. The manual override mechanism of claim 2, further comprising a forward axial stopper and an aft axial stopper disposed between the forward support bearing and the aft support bearing.

4. The manual override mechanism of claim 3, wherein the forward axial stopper and the aft axial stopper are configured to limit a total travel distance of the traveler.

5. The manual override mechanism of claim 1, wherein the traveler is configured to rotate about and translate axially relative to a central axis of the shaft in response to rotation of the shaft.

6. The manual override mechanism of claim 5, wherein the motor rack is configured to rotate about a second central axis of the motor rack in response to the traveler translating axially along the shaft.

7. A vacuum toilet system, comprising:
   a motor rack;
   a flush gate extending from the motor rack, the flush gate configured to transition from a closed position to an open position in response to the motor rack being activated; and
   a manual override mechanism, comprising:
   a shaft extending from a knob;

a forward support bearing spaced apart axially from an aft support bearing, the forward support bearing and the aft support bearing configured to support the shaft; and a traveler disposed between the first support bearing and the aft support bearing, the traveler configured to engage the shaft, wherein:

the shaft comprises a groove and the traveler comprises a guide pin, and, the groove is a helical groove.

8. The vacuum toilet system of claim 7, wherein the guide pin is configured to travel within the groove.

9. The vacuum toilet system of claim 7, further comprising a forward stopper and an aft stopper, the traveler disposed axially between the forward stopper and the aft stopper.

10. The vacuum toilet system of claim 7, wherein the traveler is configured to idle in response to the motor rack being activated during normal operation.

11. The vacuum toilet system of claim 7, wherein the motor rack comprises a gear configured to engage the traveler.

12. The vacuum toilet system of claim 7, wherein the flush gate transitions from the closed position to the open position in response to rotation of the shaft.

13. A method of operating a manual override mechanism, the method comprising:

rotating a knob of the manual override mechanism, wherein in response to rotating the knob:

a shaft extending from the knob rotates, a traveler rotates about a central axis of the shaft and translates axially along the shaft, a motor rack rotates about a second central axis of the motor rack; and a flush gate rotates about the second central axis of the motor rack and transitions from a closed position to an open position, wherein:

the traveler includes a guide pin that travels in a guide groove of the shaft during translating of the traveler, and the guide groove has a helical shape.

14. The method of claim 13, wherein the traveler stops translating in response to engaging an axial stopper.

15. The method of claim 13, wherein the traveler comprises a first gear configured to engage a second gear of the motor rack.

* * * * *